United States Patent
Kanai et al.

(10) Patent No.: US 12,084,355 B2
(45) Date of Patent: Sep. 10, 2024

(54) GARNET-TYPE COMPOSITE METAL OXIDE PARTICLE AND METHOD FOR PRODUCING SAME, AND COMPRESSION-MOLDED PRODUCT OF GARNET-TYPE COMPOSITE METAL OXIDE

(71) Applicants: KANEKA CORPORATION, Osaka (JP); OSAKA UNIVERSITY, Osaka (JP)

(72) Inventors: Kazuaki Kanai, Osaka (JP); Shohei Kitano, Osaka (JP); Makio Naito, Osaka (JP)

(73) Assignees: KANEKA CORPORATION, Osaka (JP); OSAKA UNIVERSITY, Osaka (JP)

( * ) Notice: Subject to any disclaimer, the term of this patent is extended or adjusted under 35 U.S.C. 154(b) by 708 days.

(21) Appl. No.: 17/184,147

(22) Filed: Feb. 24, 2021

(65) Prior Publication Data

US 2021/0179441 A1 Jun. 17, 2021

Related U.S. Application Data

(63) Continuation of application No. PCT/JP2019/029383, filed on Jul. 26, 2019.

(30) Foreign Application Priority Data

Aug. 30, 2018 (JP) .................. 2018-161931

(51) Int. Cl.
*C01G 25/00* (2006.01)
*H01M 10/0562* (2010.01)

(52) U.S. Cl.
CPC ...... *C01G 25/006* (2013.01); *H01M 10/0562* (2013.01); *C01P 2002/60* (2013.01);
(Continued)

(58) Field of Classification Search
None
See application file for complete search history.

(56) References Cited

U.S. PATENT DOCUMENTS

| 2015/0118571 A1 | 4/2015 | Liu et al. |
| 2016/0049688 A1 | 2/2016 | Sung et al. |

(Continued)

FOREIGN PATENT DOCUMENTS

| CN | 107732295 A | 2/2018 |
| JP | 2014-22319 A | 2/2014 |

(Continued)

OTHER PUBLICATIONS

Hao et "Solid-state lithium battery chemistries achieving high cycle performance at room temperature by a new garnet-based composite electrolyte"; Shimeng Hao, Hui Zhang, Wei Yao, Junpin Lin; Journal of Power Sources 393 (May 12, 2018) 128-134 ( Year: 2018).*

Shimeng Hao, et al., "Solid-state lithium battery chemistries achieving high cycle performance at room temperature by a new garnet-based composite electrolyte"; Journal of Power Sources, vol. 393, pp. 128-134; Available Online May 12, 2018 (7 pages).

(Continued)

*Primary Examiner* — Humera N. Sheikh
*Assistant Examiner* — Elizabeth D Ivey
(74) *Attorney, Agent, or Firm* — Osha Bergman Watanabe & Burton LLP

(57) ABSTRACT

The present disclosure is directed to a composite metal oxide particle, and method of producing the same, having an excellent lithium ion conductivity that may be produced at low cost. The present disclosure relates to a garnet-type composite metal oxide particle, containing Li, La, Zr and O; Ga and/or Al; and a halogen element, where a part of a Li site is substituted with the Ga and/or the Al, and at least a part of a particle surface is covered with a melt-solidified material. A ratio of an area covered with the melt-solidified material to a total area of the particle is preferably 10% or more, and the halogen element is preferably Cl.

16 Claims, 7 Drawing Sheets

(52) U.S. Cl.
CPC ...... *C01P 2002/72* (2013.01); *C01P 2002/85* (2013.01); *C01P 2004/03* (2013.01); *C01P 2004/04* (2013.01); *H01M 2300/0071* (2013.01)

(56) References Cited

U.S. PATENT DOCUMENTS

| | | | |
|---|---|---|---|
| 2016/0308244 A1 | 10/2016 | Badding et al. | |
| 2017/0194663 A1* | 7/2017 | Zhamu | C25D 9/08 |
| 2018/0219253 A1 | 8/2018 | Ohta | |
| 2018/0309163 A1* | 10/2018 | Kim | H01M 4/667 |
| 2021/0194045 A1 | 6/2021 | Beck et al. | |

FOREIGN PATENT DOCUMENTS

| | | |
|---|---|---|
| JP | 2017-91788 A | 5/2017 |
| JP | 2018-65704 A | 4/2018 |
| JP | 2018-516219 A | 6/2018 |
| WO | 2017/002467 A1 | 1/2017 |

OTHER PUBLICATIONS

International Search Report issued in corresponding International Application No. PCT/JP2019/029383 mailed Oct. 21, 2019 (3 pages).

Written Opinion of the International Searching Authority issued in corresponding International Application No. PCT/JP2019/029383 mailed Oct. 21, 2019 (3 pages).

Extended European Search Report issued in corresponding European Patent Application No. EP 19855682.1 dated May 2, 2022 (8 pages).

International Search Report issued in corresponding International Application No. PCT/JP2019/029382 mailed Oct. 21, 2019 (5 pages).

Written Opinion of the International Searching Authority issued in corresponding International Application No. PCT/JP2019/029382 mailed Oct. 21, 2019 (5 pages).

U.S. Office Action issued in corresponding U.S. Appl. No. 17/163,804, dated Sep. 20, 2023, (22 pages).

* cited by examiner

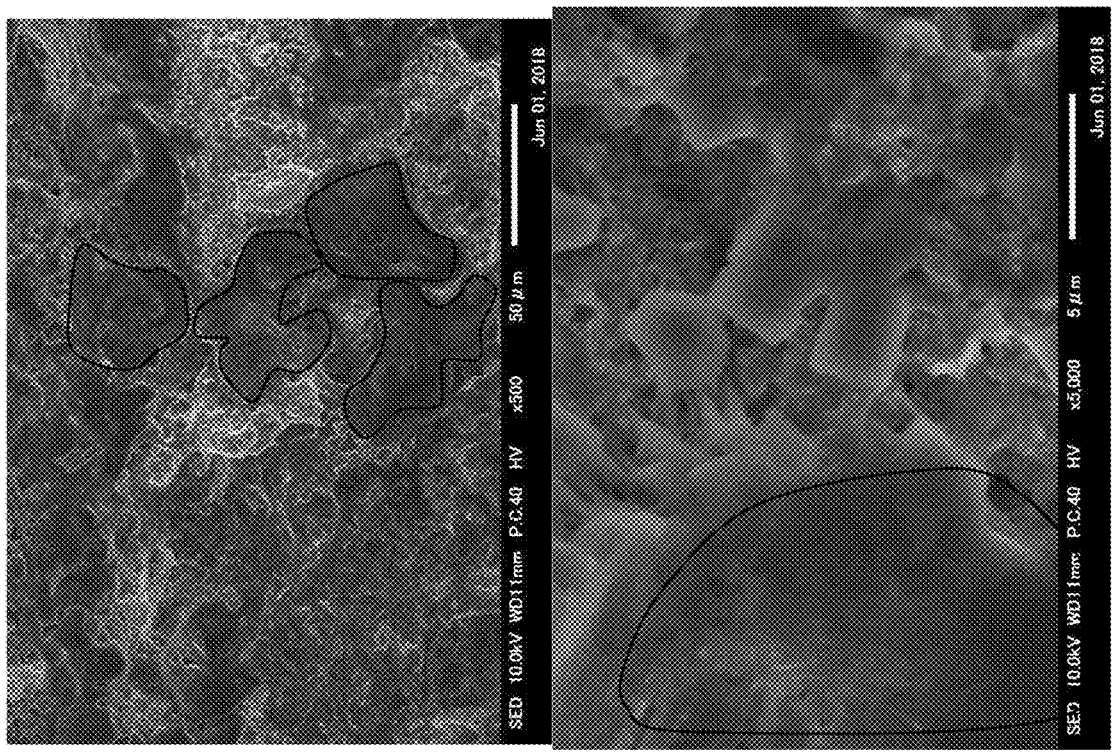
Fig.6(B) Example 3
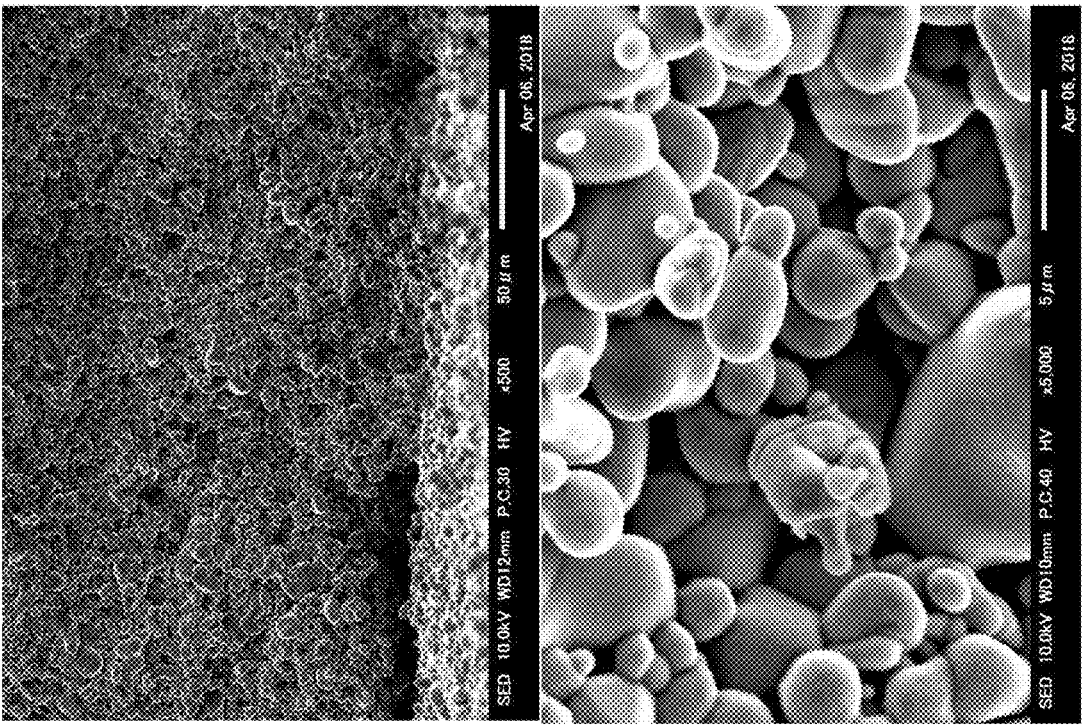
Fig.6(A) Comparative example 2

Example 3 Cross-sectional STEM image

Example 1 Cross-sectional STEM image

GARNET-TYPE COMPOSITE METAL OXIDE PARTICLE AND METHOD FOR PRODUCING SAME, AND COMPRESSION-MOLDED PRODUCT OF GARNET-TYPE COMPOSITE METAL OXIDE

TECHNICAL FIELD

One or more embodiments of the present invention relate to a garnet-type composite metal oxide particle, a production method therefor, and a compression-molded product of the garnet-type composite metal oxide.

BACKGROUND

A composite metal oxide contains a plurality of metal. Some composite metal oxides have a property such as a fluorescence property, a strong dielectric property, a superconducting property and an ion-conducting property, and are applied to various fields depending on a property thereof. For example, an ion conductor LIC was developed as an all-solid battery material (Patent document 1). The ion conductor LIC is produced by first preparing an ion conductor, mixing the ion conductor and a lithium halide, and heating the mixture. For example, it is described that a LLZ-MgSr powder, which is an ion conductor $Li_7La_3Zr_2O_{12}$ substituted with Mg and Sr, is produced by mixing raw materials containing each element of the LLZ-MgSr, i.e. $Li_2CO_3$, MgO, $La(OH)_3$, $SrCO_3$, $ZrO_2$, $SrCO_3$ and $ZrO_2$, for 15 hours, firing the mixture at 1000° C. for 10 hours, further adding a powder of a lithium halide such as LiCl, and heating the mixture at 80° C. for 7 hours.

PATENT DOCUMENT

Patent document 1: JP 2017-91788 A

SUMMARY

There is room for improvement on the technology described in the above-described Patent document, since Sr is an element that may cause an adverse effect on a human body and it is difficult to use a large amount of Sr as an element for an all-solid battery, of which market is expected to grow in the future. In addition, there is room for improvement on the technology described in the above-described Patent document, since the technology is disadvantageous in terms of a long production time and cost. Specifically, in the technology, the production process has many steps and is cumbersome as an ion conductor is preliminarily produced, a lithium halide and the ion conductor are mixed, and the mixture is heated. Furthermore, the step to produce the ion conductor requires a high temperature and long time.

One or more embodiments of present invention are directed to providing a composite metal oxide particle which is a garnet-type composite metal oxide particle and which has an excellent lithium ion conductivity with easiness at low cost without containing Mg and Sr unlike with Patent document 1.

One or more embodiments of the invention is described as follows:

A garnet-type composite metal oxide particle,
  comprising Li, La, Zr and O; Ga and/or Al; and a halogen element,
  wherein a part of a Li site is substituted with the Ga and/or the Al, and
  at least a part of a particle surface is covered with a melt-solidified material.

Embodiments of the present invention can provide an excellent lithium ion conductor which can be used as a good material of a solid electrolyte material for a secondary battery.

BRIEF DESCRIPTION OF THE DRAWINGS

FIG. 6(A) and FIG. 6(B) show photographs of SEM images of the cross-sections of the pellets of Comparative example 2 and Example 3.

DETAILED DESCRIPTION

Hereinafter, the garnet-type composite metal oxide comprising Li, La, Zr and O is referred to as "LLZ" in this disclosure.

In the above-described Patent document 1, the LLZ produced by a firing method and a lithium halide are mixed and the mixture is shaped. On the one hand, in one or more embodiments of the present invention, a mixture comprising a Li source powder, a La source powder, a Zr source powder and a lithium halide as a flux is treated by a mechanochemical method. At least a part of the surface of the LLZ particle obtained by such a method according to one or more embodiments of the present invention is covered with a melt-solidified material. A ratio of a part covered with the melt-solidified material to the whole particle surface is 10 area % or more. It was found that such a particle exhibits an excellent ion conductivity even without a heat treatment. The production method of one or more embodiments of the present invention achieves a high yield and is advantageous in respect of cost, since the garnet-type composite metal oxide particle comprising Li, La, Zr and O; Ga and/or Al which substitutes a part of a Li site; and a halogen element can be easily produced in one step at low temperature in a short time by the production method of one or more embodiments of the present invention.

First, the garnet-type composite metal oxide particle of one or more embodiments of the present invention is described.

The basic constitution of the particle according to one or more embodiments of the present invention is the garnet-type composite metal oxide comprising Li, La, Zr and O. A garnet structure generally has a composition formula of $A_3B_2C_3O_{12}$, and the garnet-type composite metal oxide of one or more embodiments of the present invention comprises Li, La, Zr and O and has a composition formula of $Li_7La_3Zr_2O_{12}$ as the A position is occupied by $La^{3+}$, the B position is occupied by $Zr^{4+}$ and the C position and interstitial position are occupied by $Li^+$ in the above composition formula. A part of $Li^+$ site in $Li_7La_3Zr_2O_{12}$ is substituted with $Al^{3+}$ and/or $Ga^{3+}$ and the garnet-type composite metal oxide further comprises a halogen element derived from a flux explained in the description of the production method described later. Thus, the garnet-type composite metal oxide particle of one or more embodiments of the present invention comprises Li, La, Zr and O; Ga and/or Al which substitutes a part of a Li site; and a halogen element. A crystal system of the garnet-type composite metal oxide particle according to one or more embodiments of the present invention is preferably cubic, since Ga and/or Al substitutes a part of a Li site.

Figure 1B:
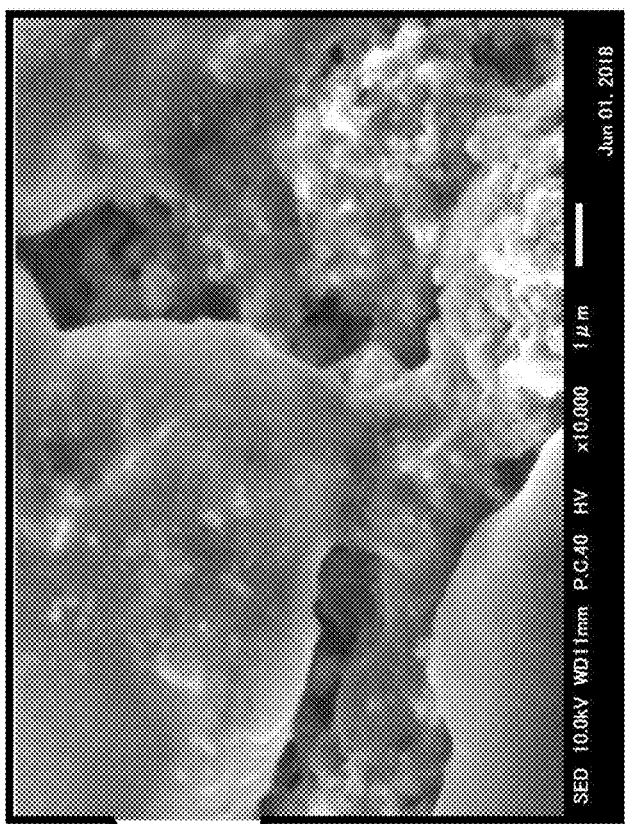
FIGS. 1(A)-1(B) show photographs of SEM images of the surface of the particle obtained in Example 3.
Figure 1A:
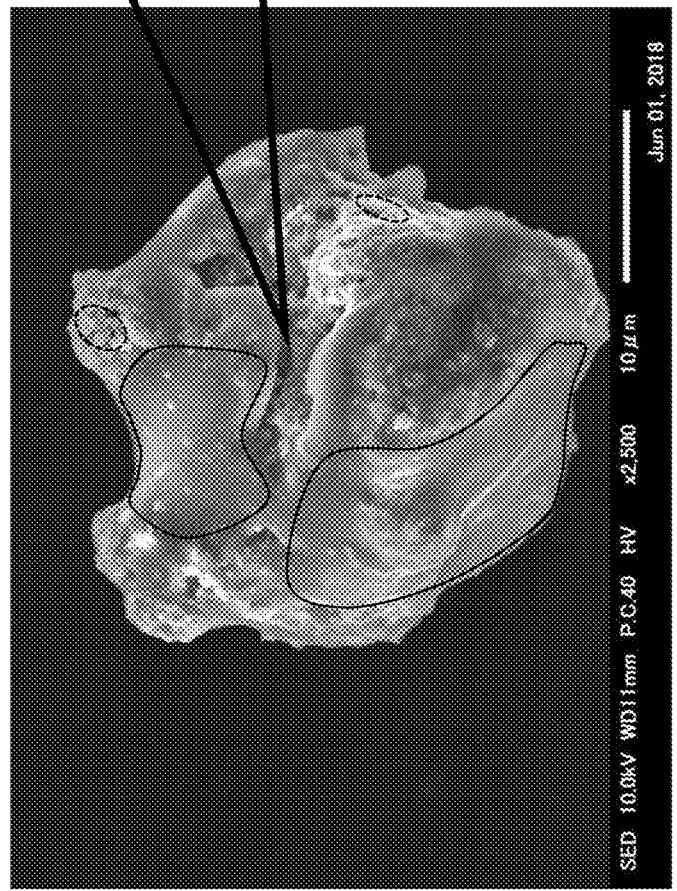

FIGS. 1(A)-1(B) shows SEM images of the surface of the particle obtained in Example 3 described later. In FIG. 1(A), the part surrounded by solid line is one embodiment of the part which is covered with a melt-solidified material layer, and the part surrounded by dotted line is one embodiment of the part which is not covered with a melt-solidified material layer. With appropriately adjusting an observation magnification as needed (FIG. 1(B)), a region observed in the same way as the part surrounded by solid line shown in FIG. 1(A) is judged over the whole particle, and the area of the whole particle and the total area of a part covered with a melt-solidified material may be measured. It is clear from FIGS. 1(A) and 1(B) that the surface of the particle is covered with a melt-solidified material and a ratio of the area covered with the melt-solidified material to the whole area of the particle is 10% or more. A ratio of the area covered with the melt-solidified material is more preferably 20% or more, even more preferably 40% or more, and particularly preferably 50% or more. The upper limit of the ratio of the area covered with the melt-solidified material is not particularly restricted and may be 100%, and the ratio may be 95% or less. The ratio of the area covered with the melt-solidified material may be an average value when measuring a plurality of the particle.

The melt-solidified material is preferably at least one of a halide derived from the halogen element contained in the flux, particularly the flux itself, and an oxyhalide containing the metal element contained in the raw material powder, i.e. at least one of Li, La, Zr, Ga and Al. When LiCl is used as the flux, the melt-solidified material is preferably at least one of LiCl and LaOCl.

In other words, the garnet-type composite metal oxide particle of one or more embodiments of the present invention is preferably a garnet-type composite metal oxide particle comprising Li, La, Zr and O; Ga and/or Al; a halogen element, wherein a part of a Li site is substituted with the Ga and/or the Al, and the garnet-type composite metal oxide particle comprises an oxyhalide which at least one of Li, La, Zr, Ga and Al forms and/or a halide which Li forms. At least a part of a surface of the garnet-type composite metal oxide particle according to one or more embodiments of the present invention is more preferably covered with an oxyhalide which at least one of Li, La, Zr, Ga and Al forms and/or a halide which Li forms. The oxyhalide which at least one of Li, La, Zr, Ga and Al forms is preferably an oxyhalide of La and more preferably LaOCl. The halide of Li is preferably LiCl. The garnet-type composite metal oxide particle of one or more embodiments of the present invention is preferably a garnet-type composite metal oxide particle comprising Li, La, Zr and O; Ga and/or Al, and Cl; wherein a part of a Li site is substituted with the Ga and/or the Al, and the garnet-type composite metal oxide particle comprises LaOCl and/or LiCl, preferably at least LaOCl.

A crystallinity of the garnet-type composite metal oxide particle according to one or more embodiments of the present invention is excellent. An excellent crystallinity can be represented by a crystallite diameter calculated from a half width of an X-ray diffraction peak by the following Scherrer equation represented as the following formula (1).

$$Dc = K\lambda/\beta \cos\theta \quad (1)$$

Dc: crystallite diameter, $\lambda$: wavelength of X-ray, K: Scherrer constant, $\beta$: half width, $\theta$: Bragg angle A crystallite diameter of the garnet-type composite metal oxide particle according to one or more embodiments of the present invention may be 20 nm or more, preferably 25 nm or more, more preferably 30 nm or more, and generally 50 nm or less.

A particle diameter of the garnet-type composite metal oxide particle according to one or more embodiments of the present invention as $D_{50}$ measured on a volumetric basis by a laser diffractometry scattering method is generally 10 μm or more and 100 μm or less.

When the garnet-type composite metal oxide particle of one or more embodiments of the present invention is subjected to X-ray diffraction measurement using CuKα ray, a ratio of a maximum peak area $A_1$ of $Li_7La_3Zr_2O_{12}$ substituted with the Ga and/or the Al relative to a total of the area $A_1$ and an area $A_2$, i.e. the area $A_1/$(the area $A_1$+the area $A_2$), is generally 20% or more and less than 100%. The $A_2$ is a maximum peak area of a diffraction peak area of a compound comprising La, and the compound comprising La is other than the $Li_7La_3Zr_2O_{12}$ substituted with the Ga and/or the Al and the oxyhalide of the La. The above-described "compound comprising La other than the $Li_7La_3Zr_2O_{12}$ and La oxyhalide" generally means a La source as the raw material of the garnet-type composite metal oxide particle according to one or more embodiments of the present invention, and is preferably at least one of a La oxide, a La hydroxide and a La carbonate salt and more preferably a La oxide, i.e. $La_2O_3$. The ratio of the area $A_1/$(the area $A_1$+the area $A_2$) is more preferably 25% or more and even more preferably 30% or more. With respect to the upper limit thereof, the ratio may be 90% or less, 70% or less, or 50% or less.

When the garnet-type composite metal oxide particle of one or more embodiments of the present invention is cut and the obtained cross-section is observed using an electron microscope such as SEM or STEM at, for example, about 1000 magnification or more and about 5000 magnification or less, an aggregate structure composed of particles depending on a particle shape of the raw material powders can be generally observed. When measuring a long diameter of particles using the above microscope on the cross-section obtained by cutting, primary particles of 90% or more based on number generally has a long diameter of 3 μm or less, preferably 2 μm or less, more preferably 1.5 μm or less, even more preferably 1.3 μm or less, and particularly preferably 1.2 μm or less. It is more preferred that particles of 100% based on individual number, i.e. all of the particles, are included in the above-described long diameter range of the primary particles, including the preferred range. On the one hand, a garnet-type composite metal oxide particle obtained by a conventional firing method is different from the garnet-type composite metal oxide particle of one or more embodiments of the present invention in the point that the raw materials are solid-solved and the boundary between the raw material powders is vanished due to high temperature; as a result, coarse particles are formed or the particle aggregate structure is not formed and the particle structure composed of fine particles observed in the garnet-type composite metal oxide particle of one or more embodiments of the present invention is not observed. The above-described primary particle is the smallest unit among the observed particles. The above-described long diameter of the primary particle means the longest line segment which passes through the center or gravity center of the particle and which is separated by the outer circumference of the particle.

Then, a method for producing the particle of one or more embodiments of the present invention is described.

At least a mechanochemical method is used in the method for producing the particle of one or more embodiments of the present invention. More specifically, not only a Li source powder, a La source powder and a Zr source powder but also a Ga source powder and/or a Al source powder are used as raw materials, and the raw material powders are reacted each other by treating a mixture containing the raw material powders and a halide of Li as a flux by a mechanochemical method to produce LLZ. The halide of Li as a flux is preferably LiCl.

The mechanochemical method can be more specifically carried out by shearing a mixture containing the raw material powders while compressing in a dry condition. In the mechanochemical method, energy is accumulated in the raw material powders and naturally released to be heat energy or to be used for surface modification, crystal structure transformation or solid-phase reaction. The raw material powders are mechanochemically treated in the presence of a halide of Li as a flux; as a result, a liquid phase, i.e. a molten material, is generated on the surface of the raw materials due to the generated energy to accelerate the reaction between the raw material powders in one or more embodiments of the present invention. Thus, the target composite metal oxide particle can be obtained in a very short time by a mechanochemical treatment only without high temperature heat treatment by the above-described production method. In addition, the thus obtained composite metal oxide particle has a high crystallinity. Furthermore, the above-described molten material becomes solidified and at least a part of the particle surface is covered with a melt-solidified material.

As the Li source powder, La source powder, Zr source powder, Al source powder and Ga source powder, for example, an oxide, a carbonate salt, a hydroxide, a chloride, an alkoxide or the like of each metal, i.e. Li, La, Zr, Al or Ga, can be used. The Li source powder is preferably a Li oxide or a Li carbonate salt, the La source powder is preferably a La oxide, a La hydroxide or a La carbonate salt, the Zr source powder is preferably a Zr oxide or a Zr hydroxide, the Al source powder is preferably an Al oxide or an Al hydroxide, and the Ga source powder is preferably a Ga oxide or a Ga hydroxide. All of the Li source powder, La source powder, Zr source powder, Al source powder and Ga source powder are preferably oxide powders of each metal, i.e. a Li oxide powder, a La oxide powder, a Zr oxide powder, an Al oxide powder and a Ga oxide powder.

The ratios of the Li source powder, La source powder, Zr source powder, Al source powder and Ga source powder to be used may be adjusted to stoichiometric ratios of the target composition. In particular, with respect to the Al source powder and/or the Ga source powder, a molar ratio of a total amount of Al amount and Ga amount to Li amount in the raw material powders is preferably adjusted to 0.05 or more. As a result, the crystal system of the thus obtained LLZ can be cubical crystal. The above molar ratio is more preferably 0.06 or more, and even more preferably 0.08 or more. The upper limit is not restricted, and for example, the molar ratio is 0.2 or less.

It is preferred that a powder property of each raw material powder is appropriately adjusted. For example, a specific surface area: $S_w$ (m$^2$/g) measured by BET method is preferably 0.5 m$^2$/g or more and 25 m$^2$/g or less. A specific surface area diameter: $d_{BET}$ (nm) can be calculated from a specific surface area: $S_w$ by the following formula.

$$d_{BET} = 6/(\rho \cdot S_w)$$

In the above formula, $\rho$ is a theoretical density.

A specific surface area diameter: $d_{BET}$ (nm) is preferably 500 nm or more and 2000 nm or less in the case of the Li source powder, 400 nm or more and 700 nm or less in the case of the La source powder, 20 nm or more and 100 nm or less in the case of the Zr source powder, 80 nm or more and 200 nm or less in the case of the Al source powder, and 20 nm or more and 100 nm or less in the case of the Ga source powder.

The BET specific surface area of a Li halide is preferably 0.4 m$^2$/g or more and 3 m$^2$/g or less, and the specific surface area diameter: $d_{BET}$ of a Li halide determined from the BET specific surface area is preferably 1600 nm or less and 100 nm or more and more preferably 1504 nm or less and 100 nm or more. An amount of a Li halide may be appropriately determined in consideration of the balance with the kind of the raw material powders to be used and the mechanochemical treatment condition, and for example, the amount of a Li halide to the total amount of the raw material powders is 4 mass % or more and 15 mass % or less.

Figure 2B:
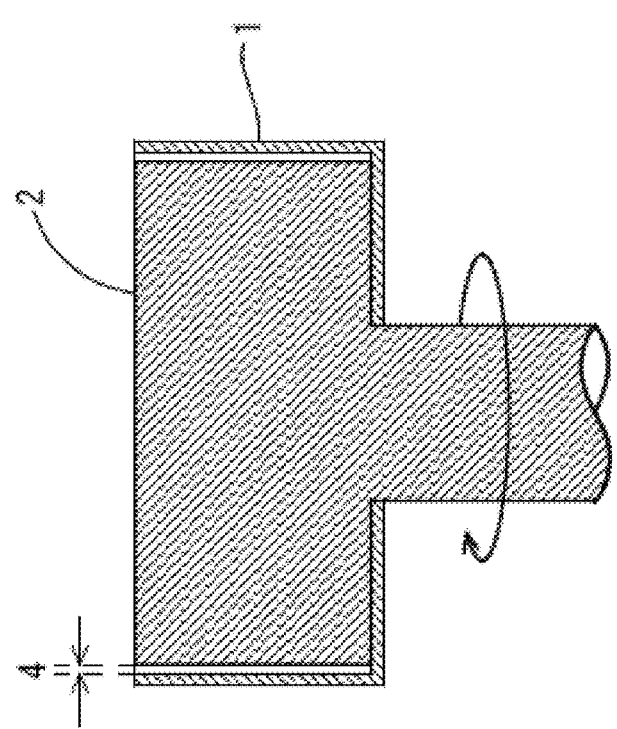
FIG. 2(B) is an A-A' cross-section of FIG. 2(A).
Figure 2:
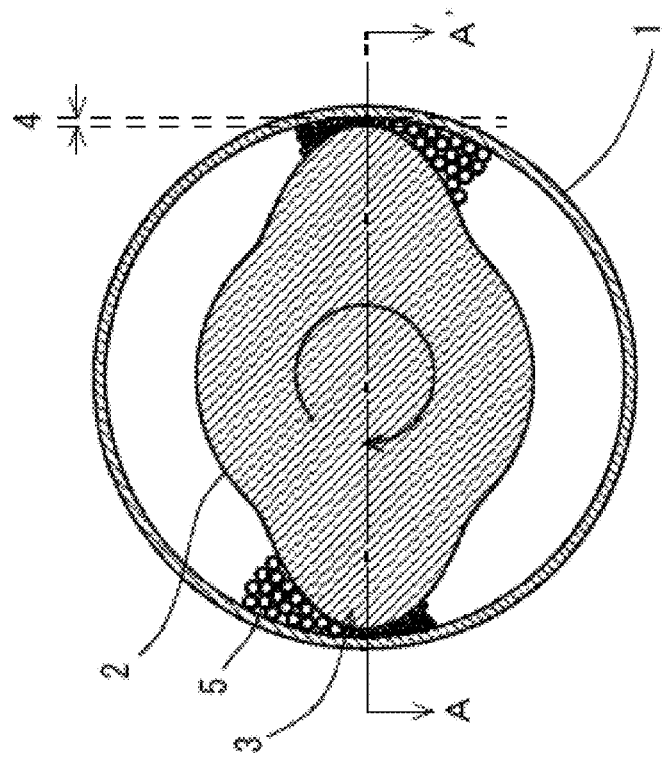
FIG. 2(A) is a cross-section of a grinding mill usable for a mechanochemical method in the direction perpendicular to the axis of rotation thereof.

More specifically, the mechanochemical method can be carried out by shearing the mixture containing the raw material powders while compressing in a dry condition as described above. One embodiment of the mechanochemical method is explained using a figure. FIG. 2(A) and FIG. 2(B) are schematic diagrams of a grinding mill capable of giving compressing force and shearing force to the mixture comprising raw material powders. FIG. 2(A) is a cross-sectional view perpendicular to an axis of rotation, and FIG. 2(B) is a cross-sectional view of A-A' of FIG. 2(A). The grinding mill of FIG. 2(A) and FIG. 2(B) is equipped with a bottomed cylindrical vessel 1 and a rotor 2. The rotor 2 has an end blade 3 having a smaller curvature than a curvature of the inner circumference of the bottomed cylindrical vessel 1, and there is a clearance 4 between the end blade 3 and the inner circumference of the bottomed cylindrical vessel 1. When the rotor 2 is rotated, compressing force and shearing force are given to a mixture 5 of the raw material powders and the flux.

With respect to the condition of the mechanochemical treatment, an excessively weak reaction condition is not preferred as the raw material powders are not reacted to each other, and an excessively strong reaction condition is not preferred as a once generated crystal becomes amorphous. When the condition of the mechanochemical treatment is not suitable, the condition may be appropriately changed depending on the reason such as insufficient reaction and amorphization or depending on the kind and amount of the raw materials and the flux. For example, the condition is adjusted as follows.

The range of the above clearance varies depending on the amount of the raw material powders, the difference between the curvature of the end blade of the rotor and the curvature of the inner circumference of the vessel, or the treatment power of the rotor. For example, the clearance is preferably less than 1 mm. When the clearance is included in the range, compressing force and shearing force can be sufficiently given to the mixture of raw material powders to accelerate the reaction between raw material powders. The clearance is preferably 0.9 mm or less and more preferably 0.8 mm or less. With respect to the lower limit of the clearance, the clearance is, for example, 100 μm or more and preferably 0.5 mm or more.

A rotating power of the rotor to the total mass of the raw material powders is preferably 0.07 kW/g or more. When the rotating power is adjusted to be higher, the solid-phase reaction between the raw material powders is accelerated. The rotating power is preferably 0.08 kW/g or more, more preferably 0.09 kW/g or more, and particularly preferably 0.1 kW/g or more. The upper limit of the rotating power is not particularly restricted and is, for example, 0.5 kW/g. A rotation frequency per minute of the rotor varies depending on a size of the apparatus and a configuration of the rotor, and is, for example, 2000 rpm or more and 6000 rpm or less and preferably 3000 rpm or more and 5000 rpm or less in the above-described rotating power range.

A rotating time of the rotor can be appropriately adjusted depending on the rotating power of the rotor and is preferably 6 minutes or more, more preferably 10 minutes or more, and even more preferably 20 minutes or more. When the rotor is rotated for 6 minutes or more, compressing force and shearing force can be sufficiently given to the raw material powders so that the solid-phase reaction between raw material powders is accelerated to obtain the LLZ. The upper limit of the rotating time of the rotor is not particularly restricted and the rotating time is preferably adjusted to 30 minutes or less, since when the rotating time is excessively long, the crystallinity of the target compound is decreased and excessive energy is consumed.

A material of the above-described bottomed cylindrical vessel is not particularly restricted and exemplified by carbon steel and stainless steel such as SUS304. The bottomed cylindrical vessel may be coated so that an impurity is not immixed in the generated LLZ. An inner diameter of the vessel is, for example, 50 mm or more and 500 mm or less. The number of the end blade may be 1 or more, preferably 2 or more, and generally 8 or less.

The mechanochemical treatment produces heat, since energy is accumulated in the raw material powders due to the shearing and naturally released to be thermal energy. Thus, the production method of one or more embodiments of the present invention can be conducted without heating from an external heat source. The mechanochemical treatment may be conducted in a condition with heat or with cooling by water or the like. An achieving temperature of the cylindrical vessel during the mechanochemical treatment is preferably adjusted to 60° C. or higher, more preferably 65° C. or higher, even more preferably 150° C. or higher, and may be 500° C. or lower or 350° C. or lower. A time for the mechanochemical treatment may be, for example, 5 minutes or more and 1 hour or less, and preferably 6 minutes or more and 30 minutes or less.

An atmosphere during the mechanochemical treatment is not particularly restricted and may be any one of oxygen-containing atmosphere such as air, inert gas atmosphere and reducing gas atmosphere. The inert gas is exemplified by nitrogen, helium and argon, and is particularly preferably nitrogen gas. An example of the reducing gas includes a mixed gas of the above inert gas, particularly preferably nitrogen gas, and 3% or more and 5% or less of hydrogen gas.

The crystallinity of the LLZ obtained by the mechanochemical treatment using the flux is excellent. The LLZ may be fired after the mechanochemical treatment in order to further improve the crystallinity. The crystallinity is sufficiently excellent under the condition that the firing temperature is 1300° C. or lower (the lower limit thereof is, for example, 500° C. or higher), and the firing time is 20 hours or less (the lower limit thereof is, for example, 30 minutes or more), since the LLZ has excellent crystallinity even without firing after the mechanochemical treatment. Not conducting firing or adjusting a firing condition mild also has an advantage that a misalignment of the composition due to volatilization of Li can be suppressed.

When the final product obtained by the above-described production method is analyzed by XRD, a ratio of the maximum peak area of the LLZ to the total of the maximum peak area of the La source powder and the maximum peak area of the LLZ is, for example, 20% or more and less than 100%, and preferably 20% or more and 60% or less. The above LLZ means a LLZ substituted with Ga and/or Al. The above ratio tends to increase in association with the increase of the mechanochemical treatment time. A peak of an oxyhalide is observed in the XRD of the final product in some cases, and a peak of a halide as the flux itself is observed in some cases depending of the amount of the added flux. When LiCl is used as the flux, a peak of LaOCl is preferably observed and a peak of LiCl is further observed in some cases.

The garnet-type composite metal oxide particle of one or more embodiments of the present invention is characterized in that a whole hardness of the particle containing the melt-solidified material is soft, since the particle is covered with the melt-solidified material as described above. Thus, the compression-molded product obtained by compressing and molding the garnet-type composite metal oxide particle of one or more embodiments of the present invention has a pasty structure in which a boundary between particles is vanished due to a compressive stress. A ratio of an area of the pasty structure on the cross-section parallel to a compression direction of the compression-molded product is preferably 10 area % or more. The ratio of the area of the pasty structure is more preferably 20 area % or more and even more preferably 30 area % or more. The upper limit of the area of the pasty structure is not particularly restricted, and the ratio of the area may be 100 area % and 90 area % or less.

The compression-molded product obtained from the garnet-type composite metal oxide particle of one or more embodiments of the present invention is suitably used for a solid electrolyte material for a secondary battery, since the compression-molded product has a lithium ion conductivity. An ion conductivity of the compression-molded product of one or more embodiments of the present invention at room temperature is, for example, $1.0 \times 10^{-7}$ S/cm or more, more preferably $5.0 \times 10^{-7}$ S/cm or more, even more preferably $1.0 \times 10^{-6}$ S/cm or more, and particularly preferably $5.0 \times 10^{-6}$ S/cm or more. The upper limit of the ion conductivity is not restricted, and the ion conductivity is, for example, $5.0 \times 10^{-4}$ S/cm or less.

The present application claims the benefit of the priority dates of Japanese patent application No. 2018-161931 filed on Aug. 30, 2018. All of the contents of the Japanese patent application No. 2018-161931 filed on Aug. 30, 2018, are incorporated by reference herein.

EXAMPLES

Hereinafter, the examples are described to demonstrate one or more embodiments of the present invention more specifically, but one or more embodiments of the present invention are in no way restricted by the examples, and the examples can be appropriately modified to be carried out within a range which adapts to the contents of this specification. Such a modified example is also included in the range of one or more embodiments of the present invention.

Example 1

As raw materials of $Li_{5.5}Ga_{0.5}La_3Zr_2O_{12}$, powders of $Li_2O$ (manufactured by Kojundo Chemical Laboratory Co., Ltd., Purity: 99%, Specific surface area $S_w$: 2.1 m$^2$/g, Specific surface area diameter $d_{BET}$: 1421 nm), $La_2O_3$ (manufactured by Kojundo Chemical Laboratory Co., Ltd., Purity: 99.9%, Specific surface area $S_w$: 1.7 m$^2$/g, Specific surface area diameter $d_{BET}$: 543 nm), $ZrO_2$ (manufactured by Kojundo Chemical Laboratory Co., Ltd., Purity: 98%, Specific surface area $S_w$: 18.4 m$^2$/g, Specific surface area diameter $d_{BET}$: 57 nm) and $Ga_2O_3$ (manufactured by Kojundo Chemical Laboratory Co., Ltd., Purity: 99.99%, Specific surface area $S_w$: 10.4 m$^2$/g, Specific surface area diameter $d_{BET}$: 90 nm) were respectively weighed at a stoichiometric ratio that forms $Li_{5.5}Ga_{0.5}La_3Zr_2O_{12}$ as the obtained composite metal oxide, and in a total amount of 30 g. The raw materials and 10 mass parts of LiCl (Purity: 99.99%, Specific surface area $S_w$: 1.9 m$^2$/g, Specific surface area diameter $d_{BET}$: 1504 nm, Melting point: 613° C.) to 100 mass parts of the total raw materials were added into a grinding mill shown as FIG. 2(A) and FIG. 2(B). The bottomed cylindrical vessel 1 was composed of SUS304, the inner diameter thereof was 80 mm, and the clearance 4 between the inner circumference of the vessel 1 and the end blade 3 of the rotor 2 was 0.8 mm. The grinding mill was rotated at the frequency per minute of 4274 rpm and the power requirement of 3 kW for 6 minutes to conduct the mechanochemical treatment. The achieving temperature of the vessel was about 65° C.

Figure 5:
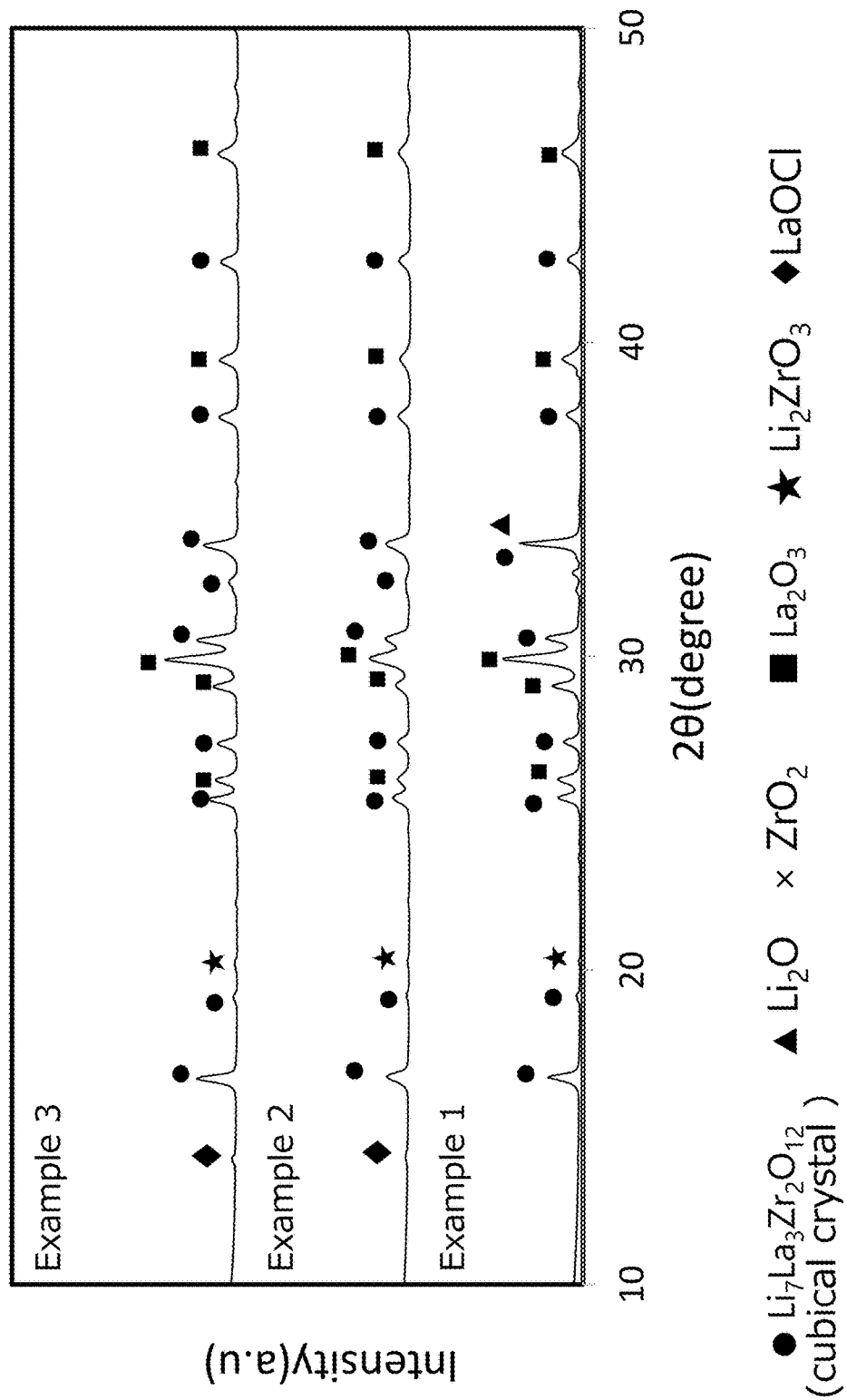
FIG. 5 is a graph to show the XRD analysis result of the particles obtained in Examples.

The crystal structure of the obtained product was analyzed using XRD (X-ray Diffraction analysis) apparatus manufactured by Bruker. The measurement was conducted using CuKα ray in the conditions of λ=1.5418 nm and θ=10° or more and 50° or less. As a result, cubical LLZ of which a part of Li site was substituted with Ga was generated in the obtained product as shown in FIG. 5. The calculated ratio of the area of the maximum peak of LLZ to the total of the area of the maximum peak of the LLZ and the area of the maximum peak of $La_2O_3$ in the XRD pattern was 29%. In addition, the crystallite diameter determined from the half width of the diffraction peak having maximum intensity of the LLZ on the basis of Scherrer equation was 33.6 nm.

The obtained particle product was observed using SEM ("JSM-IT100LV") manufactured by NEC Corporation with a magnification of 2500 times; as a result, the particle surface was covered with a melt-solidified material similarly to that of FIGS. 1(A) and 1(B) which shows Example 3. In addition, by analyzing the SEM image, a solidified part of meltage was distinguished from the other part, i.e. an aggregate structure composed of particles, similar to FIGS. 3(A) and 3(B) described later, and the whole area of the particle and the area covered with the melt-solidified material were measured, then a covering ratio of the melt-solidified material to the whole area of the particle was calculated.

As a result, the average value of the measured values of 8 arbitrary particles was 53.3%.

The obtained particle product was added into a mold and pressure of 375 MPa was applied to form a pellet having a diameter of 10 mm and a thickness of about 1 mm. The obtained pellet was annealed under nitrogen atmosphere at 240° C. for 6 hours, and Au was sputtered on the both surface of the pellet to form electrodes having a diameter of 8 mm. The obtained pellet sample was set on an all-solid-state battery evaluation cell manufactured by Hohsen Corporation, the cell was connected to a potentio-galvanostat, and an impedance was measured to evaluate an ion conductivity. As a result, an ion conductivity at room temperature was $6.4 \times 10^{-6}$ [S/cm].

Example 2

The mechanochemical treatment was conducted in the similar condition to Example 1 except that the rotating time of the grinding mill was 10 minutes and the frequency per minute was 3166 rpm. The achieving temperature of the vessel of the grinding mill was about 186° C.

The crystal structure and a ratio of the generated LLZ of the obtained particle product were evaluated by a similar method to Example 1; as a result, cubical LLZ of which a part of a Li site was substituted by Ga was generated, and a ratio of the maximum peak area of the LLZ to the total of the maximum peak area of the LLZ and the maximum peak area of $La_2O_3$ was 36%. The crystallite diameter measured from the half width of the diffraction peak having maximum intensity of the LLZ on the basis of Scherrer equation was 24.1 nm. The peak of LaOCl was observed in the vicinity of 26-13° in the XRD pattern.

In addition, ratios of the area covered with the melt-solidified material to the whole particle area of 8 arbitrary particles were measured similarly to Example 1. The average value was 75.1%.

Furthermore, a pellet was prepared from the obtained particle product, and an impedance was measured to evaluate an ion conductivity by a similar method to Example 1. As a result, an ion conductivity at room temperature was $7.8 \times 10^{-6}$ [S/cm].

Example 3

The mechanochemical treatment was conducted in a similar condition to Example 1 except that the rotating time of the grinding mill was 20 minutes and the frequency per minute was 4466 rpm. The achieving temperature of the vessel of the grinding mill was about 290° C.

The crystal structure and a ratio of the generated LLZ of the obtained particle product were evaluated by a similar method to Example 1; as a result, cubical LLZ of which a part of a Li site was substituted by Ga was generated, and a ratio of the maximum peak area of the LLZ to the total of the maximum peak area of the LLZ and the maximum peak area of $La_2O_3$ was 37%. The crystallite diameter measured from the half width of the diffraction peak having maximum intensity of the LLZ on the basis of Scherrer equation was 32.5 nm.

Figure 3B:
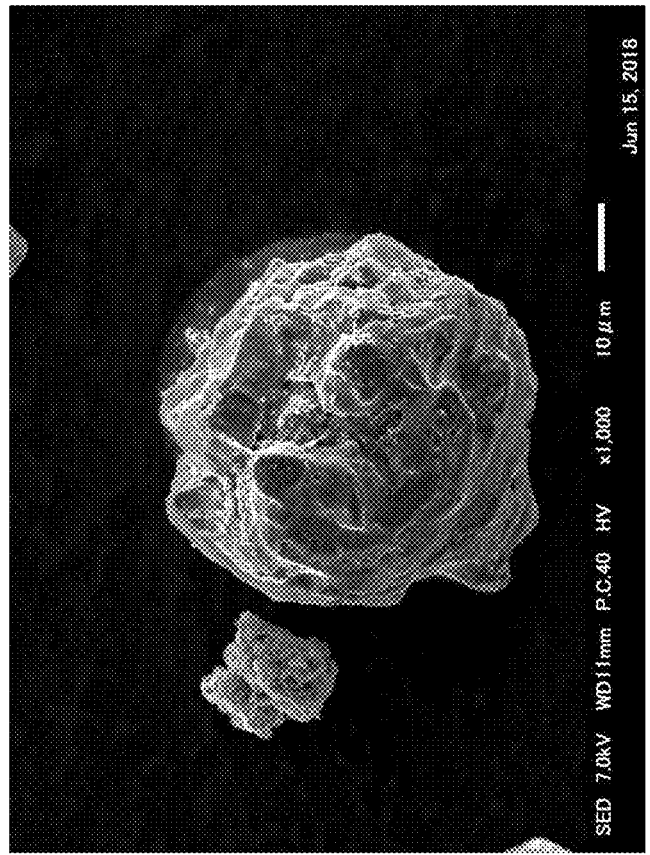
FIGS. 3(A) and 3(B) show figures to show the method for measuring the area of the melt-solidified material on the surface of the particle obtained in Example 3.
Figure 3A:
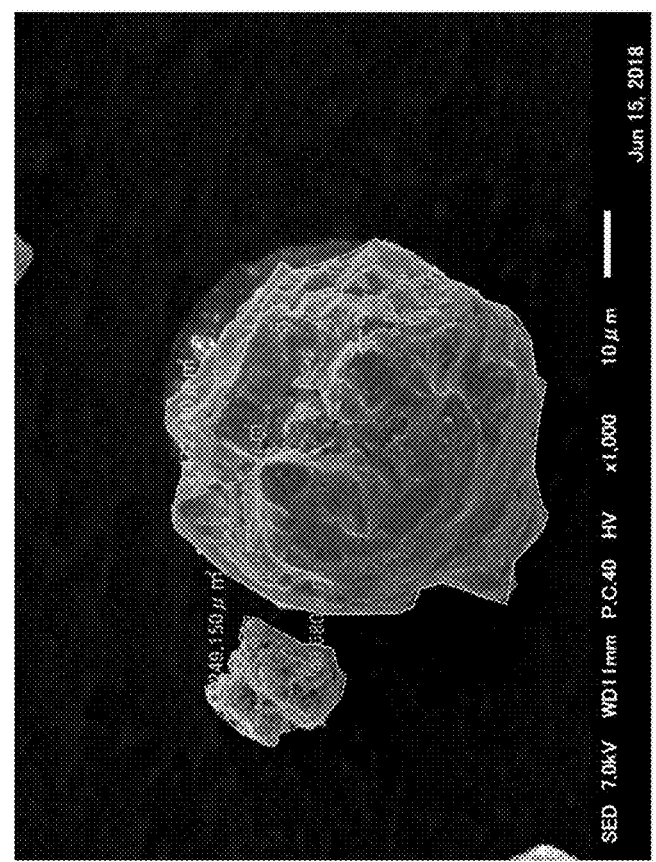
Figure 4A:
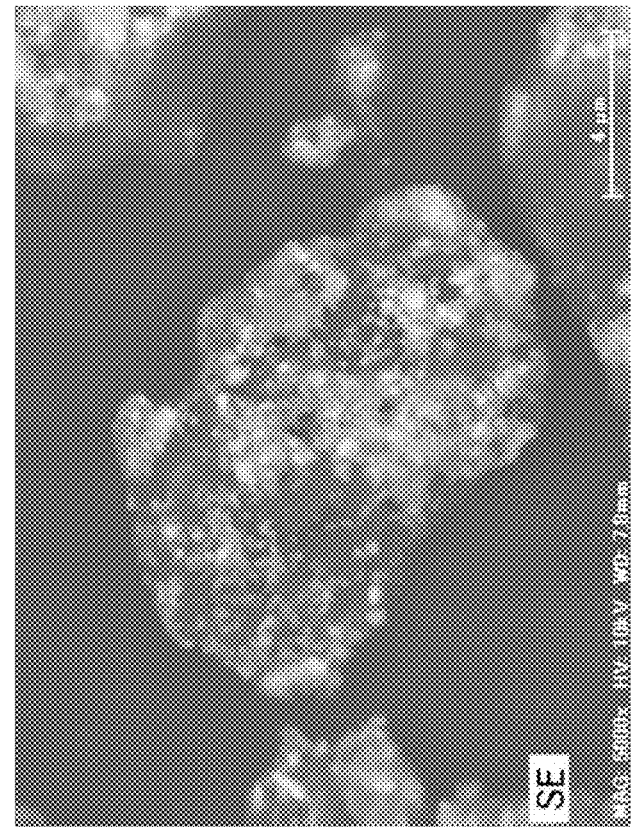
FIGS. 4(A) and 4(B) show figures to show the result of the elemental analysis by EDX (Energy Dispersive X-ray Spectrometry) of the particle obtained in Example 3.
Figure 4B:
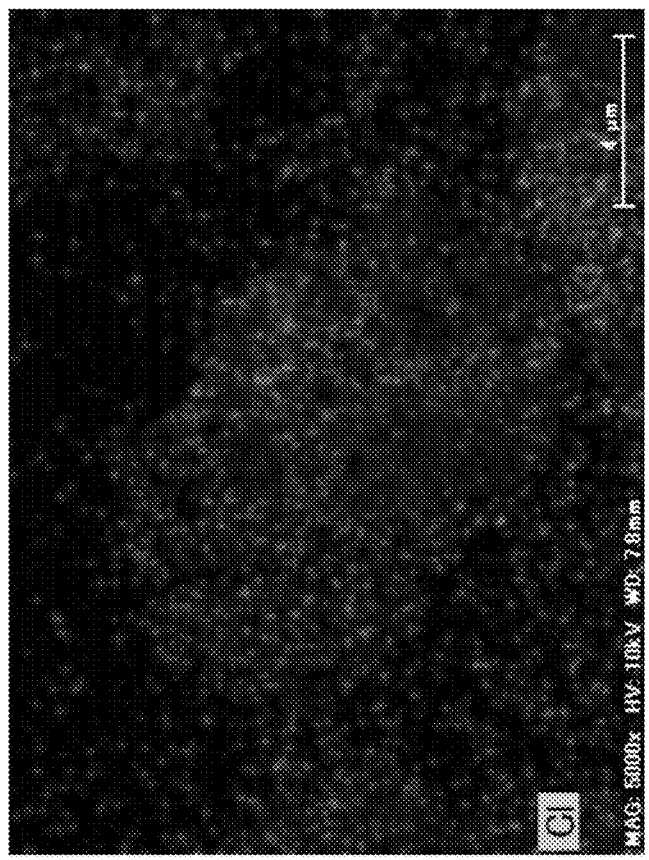

The surface of the obtained particle was observed; as a result, the particle surface was covered with a melt-solidified material as shown in FIGS. 1(A) and 1(B), and a solidified part of meltage was clearly distinguished from the other part, i.e. an aggregate structure composed of particles, as shown in FIG. 3(A) and FIG. 3(B). The ratios of the area covered with the melt-solidified material to the whole particle area of 8 arbitrary particles were measured similarly to Example 1. The average value was 91.0%. The peak of LaOCl was observed in the vicinity of 26-13° in the XRD pattern. There were many Cl elements in the existing location of the melt-solidified material on the basis of FIGS. 4(A) and 4(B) which shows the result of the elemental analysis of the obtained particle using EDX. The melt-solidified material is considered to be the halide as the flux or the oxyhalide generated by the reaction between the flux and the raw material powders in consideration of the melting points of the used raw material powders, flux and the by-product generated therefrom, and the existence of Cl in the existing location of the melt-solidified material on the basis of FIG. 4(B) which shows the result of the elemental analysis.

Furthermore, a pellet was prepared from the obtained particle product, and an impedance was measured to evaluate an ion conductivity by a similar method to Example 1. As a result, an ion conductivity at room temperature was $8.7 \times 10^{-5}$ [S/cm].

Example 4

A pellet was prepared by a similar method to Example 3 except that the pellet was not annealed at 240° C. for 6 hours, and impedance was measured to evaluate an ion conductivity. As a result, an ion conductivity at room temperature was $1.2 \times 10^{-6}$ [S/cm].

Example 5

A pellet was prepared by a similar method to Example 3 except that the pellet was not annealed at 240° C. for 6 hours and the pressure for the pellet forming was changed to 100 MPa, and impedance was measured to evaluate an ion conductivity. As a result, an ion conductivity at room temperature was $3.0 \times 10^{-7}$ [S/cm].

Example 6

A pellet was prepared by a similar method to Example 3 except that the pellet was not annealed at 240° C. for 6 hours and the pressure for the pellet forming was changed to 200 MPa, and impedance was measured to evaluate an ion conductivity. As a result, an ion conductivity at room temperature was $8.0 \times 10^{-7}$ [S/cm].

Comparative Example 1

A powder of $Li_{6.25}Al_{0.25}La_3Zr_2O_{12}$ manufactured by Toshima Manufacturing Co., Ltd. by a firing method was analyzed using XRD (X-ray Diffraction analysis) apparatus manufactured by Bruker; as a result, the powder had LLZ single phase.

The powder was added into a mold and pressure of 375 MPa was applied to form a pellet having a diameter of 10 mm and a thickness of about 1 mm. Au was sputtered on the both surface of the pellet to form electrodes having a diameter of 8 mm. The obtained pellet sample was set on an all-solid-state battery evaluation cell manufactured by Hohsen Corporation, the cell was connected to a potentio-galvanostat, and an impedance was measured to evaluate an ion conductivity. An ion conductivity, however, could not be measured, since a resistance was too high.

Comparative Example 2

An ion conductivity was evaluated similarly to Comparative example 1 except that the formed pellet was fired in the atmosphere at 1000° C. for 3 hours. An ion conductivity, however, could not be measured, since a resistance was too high.

The results of the above-described Examples and Comparative examples are shown in Table 1.

TABLE 1

| | Target composition | Treatment power (kW) | Treatment time [min] | Clearance [mm] | Achieving temp. of grinding mill [° C.] | LLZ crystal system |
|---|---|---|---|---|---|---|
| Example 1 | $Li_{5.5}Ga_{0.5}La_3Zr_2O_{12}$ | 3 | 6 | 0.8 | 65 | cubical crystal |
| Example 2 | $Li_{5.5}Ga_{0.5}La_3Zr_2O_{12}$ | 3 | 10 | 0.8 | 186 | cubical crystal |
| Example 3 | $Li_{5.5}Ga_{0.5}La_3Zr_2O_{12}$ | 3 | 20 | 0.8 | 290 | cubical crystal |
| Example 4 | $Li_{5.5}Ga_{0.5}La_3Zr_2O_{12}$ | 3 | 20 | 0.8 | 290 | cubical crystal |
| Example 5 | $Li_{5.5}Ga_{0.5}La_3Zr_2O_{12}$ | 3 | 20 | 0.8 | 290 | cubical crystal |
| Example 6 | $Li_{5.5}Ga_{0.5}La_3Zr_2O_{12}$ | 3 | 20 | 0.8 | 290 | cubical crystal |
| Comparative example 1 | $Li_{6.25}Al_{0.25}La_3Zr_2O_{12}$ (manufactured by Toshima Manufacturing Co., Ltd) | — | — | — | — | cubical crystal |
| Comparative example 2 | $Li_{6.25}Al_{0.25}La_3Zr_2O_{12}$ (manufactured by Toshima Manufacturing Co., Ltd) | — | — | — | — | cubical crystal |

| | LLZ ratio[X1] [%] | Crystallite diameter [nm] | Area ratio of melt-solidified material on particle surface [%] | Pellet compression pressure [MPa] | Pellet firing temp. [° C.] | Ion conductivity [S/cm] (25° C.) |
|---|---|---|---|---|---|---|
| Example 1 | 29 | 33.6 | 53.3 | 375 | 240 | $6.4 \times 10^{-6}$ |
| Example 2 | 36 | 24.1 | 75.1 | 375 | 240 | $7.8 \times 10^{-6}$ |

TABLE 1-continued

| | | | | | | |
|---|---|---|---|---|---|---|
| Example 3 | 37 | 32.5 | 91.0 | 375 | 240 | $8.7 \times 10^{-5}$ |
| Example 4 | 37 | 32.5 | 91.0 | 375 | N/A | $1.2 \times 10^{-6}$ |
| Example 5 | 37 | 32.5 | 91.0 | 100 | N/A | $3.0 \times 10^{-7}$ |
| Example 6 | 37 | 32.5 | 91.0 | 200 | N/A | $8.0 \times 10^{-7}$ |
| Comparative example 1 | 100 | 45.6 | — | 375 | N/A | unmeasurable |
| Comparative example 2 | 100 | 45.6 | — | 375 | 1000 | unmeasurable |

[X1]LLZ ratio in the table means the ratio of the maximum peak area of LLZ to the total of the maximum peak area of LLZ and the maximum peak area of $La_2O_3$.

The cross-sectional SEM images of the pellets of Comparative example 2 and Example 3 are shown as FIG. 6(A) and FIG. 6(B). As shown in FIG. 6(A) and FIG. 6(B), aggregate structures of particles were observed and the boundary between the particles was observed in all of the regions of the pellet produced from the LLZ prepared by a firing method; on the one hand, the pasty structure in which the boundary between the particles was vanished was observed in the pellet of one or more embodiments of the present invention. The parts enclosed by a solid line in FIG. 6(B) are examples of the pasty structure. It is clear from FIG. 6(B) that 10 area % or more of the pasty structure was observed, and 10 area % or more of the pasty structure was also observed in the pellets of Examples 1, 2 and 4 to 6. It is considered to be one of the reason why an excellent ion conductivity could be achieved that a path capable of conducting lithium ion was formed by thus disappearing the boundary of the particles.

Figure 7B:
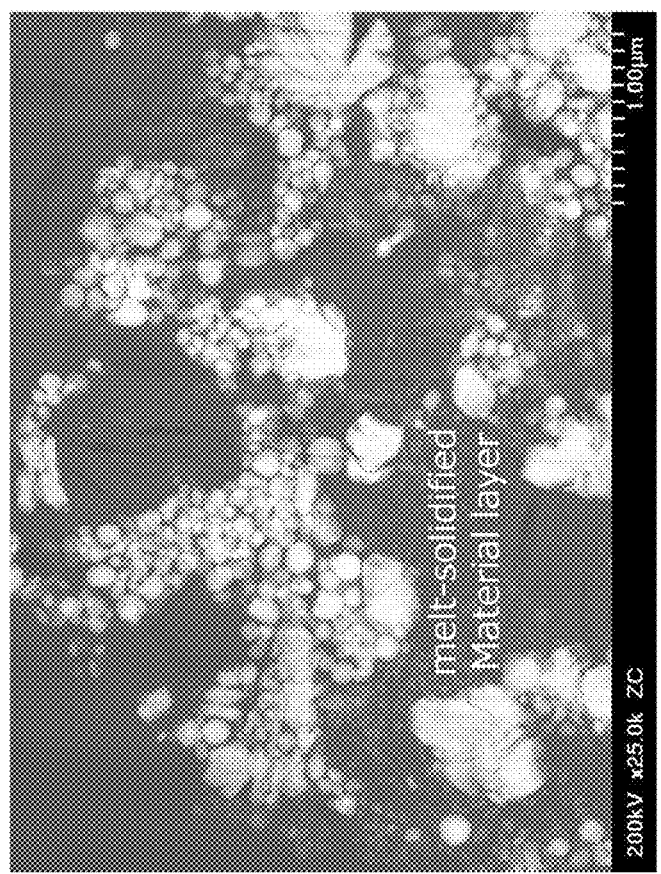
FIG. 7(A) and FIG. 7(B) show photographs of STEM images of the cross-section of the garnet-type composite metal oxide particles obtained in Examples 1 and 3.
Figure 7A:
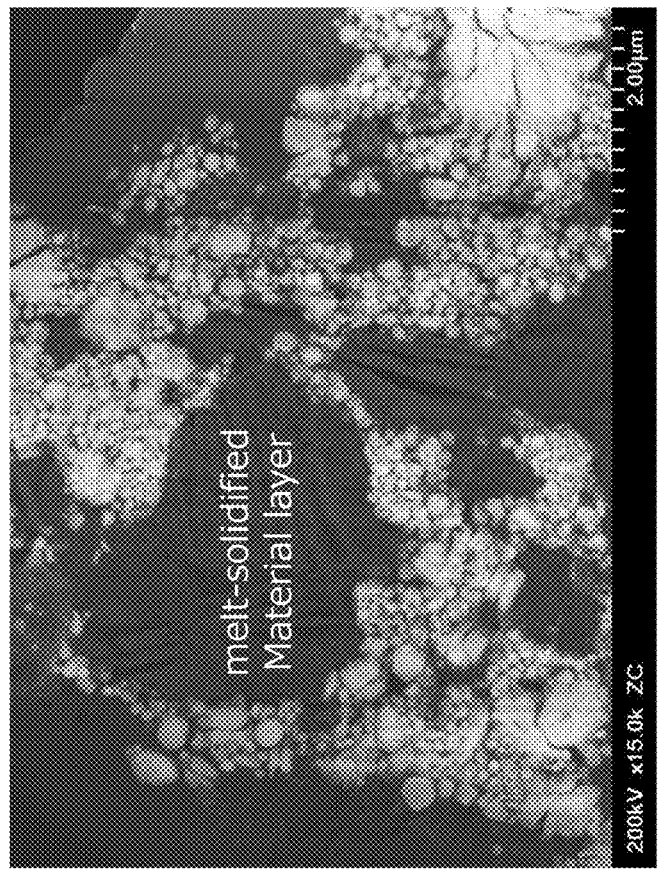

STEM images of the cross-section of the garnet-type composite metal oxide particles obtained in Examples 1 and 3, observed using STEM (HD-2700) manufactured by Hitachi High-Tech Corporation with a magnification of 15000 times or 25000 times, are respectively shown as FIG. 7(A) and FIG. 7(B). It was confirmed by FIG. 7(A) and FIG. 7(B) that the garnet-type composite metal oxide particle has an aggregate structure composed of particles and a long diameter of the constituent primary particle is 3 μm or less. The part having darker color, i.e. black or grey, in FIG. 7(A) and FIG. 7(B) is a melt-solidified material.

INDUSTRIAL APPLICABILITY

The garnet-type composite metal oxide particle of one or more embodiments of the present invention is useful as a solid electrolyte material for a lithium ion battery, since the particle has a Li ion conductivity.

Although the disclosure has been described with respect to only a limited number of embodiments, those skilled in the art, having benefit of this disclosure, will appreciate that various other embodiments may be devised without departing from the scope of the present disclosure. Accordingly, the scope of the disclosure should be limited only by the attached claims.

The invention claimed is:

1. A composite metal oxide particle comprising:
Li, La, Zr and O;
Ga and/or Al; and
a halogen element,
wherein:
the composite metal oxide has a garnet structure,
a part of an Li site is substituted with the Ga and/or the Al,
at least a part of a particle surface is covered with a melt-solidified material, and
a ratio of $A_1$ to a total of $A_1$ and $A_2$ is 20% or more and 90% or less,
where $A_1$ is an area of a maximum peak of $Li_7La_3Zr_2O_{12}$ substituted with the Ga and/or the Al,
where $A_2$ is an area of a maximum peak of $La_2O_3$, and
where $A_1$ and $A_2$ are obtained by X-ray diffraction analysis.

2. The composite metal oxide particle according to claim 1, wherein a ratio of an area covered with the melt-solidified material to a total area of the particle is 10% or more.

3. The composite metal oxide particle according to claim 1, wherein the halogen element is Cl.

4. The composite metal oxide particle according to claim 1, wherein the melt-solidified material is at least one of a halide and an oxyhalide.

5. A compression-molded product of a composite metal oxide comprising:
Li, La, Zr and O;
Ga and/or Al; and
a halogen element,
wherein a part of an Li site is substituted with the Ga and/or the Al,
wherein the compression-molded product is obtained by compression-molding the particle according to claim 1, and
wherein the composite metal oxide comprises a pasty structure in a cross-section parallel to a compression direction.

6. The compression-molded product according to claim 5, wherein a percent area of the pasty structure in a total area of the compression molded product in the cross-section parallel to the compression direction is 10% or more.

7. A solid electrolyte material for a secondary battery comprising the composite metal oxide particle according to claim 1.

8. The composite metal oxide particle according to claim 1, wherein the ratio of $A_1$ to a total of $A_1$ and $A_2$ is 20% or more and 50% or less.

9. A composite metal oxide particle comprising:
Li, La, Zr and O;
Ga and/or Al; and
a halogen element,
wherein:
the composite metal oxide has a garnet structure,
at least one of Li, La, Zr, Ga and Al forms an oxyhalide and/or the Li forms a halide, and
a ratio of $A_1$ to a total of $A_1$ and $A_2$ is 20% or more and 90% or less,
where $A_1$ is an area of a maximum peak of $Li_7La_3Zr_2O_{12}$ substituted with the Ga and/or the Al,
where $A_2$ is an area of a maximum peak of $La_2O_3$, and
where $A_1$ and $A_2$ are obtained by X-ray diffraction analysis.

10. A solid electrolyte material for a secondary battery, comprising the composite metal oxide particle according to claim 9.

11. The composite metal oxide particle according to claim 9, wherein the ratio of $A_1$ to a total of $A_1$ and $A_2$ is 20% or more and 50% or less.

12. A method for producing the garnet-type composite metal oxide particle according to claim 1, comprising at least a step of reacting by a mechanochemical method.

13. The method for producing the garnet-type composite metal oxide particle according to claim 12, wherein a mixture is treated by reacting in the mechanochemical method, wherein the mixture comprises:
   an Li source powder,
   an La source powder and a Zr source powder;
   a Ga source powder and/or an Al source powder; and
   a halide of Li.

14. The method for producing the garnet-type composite metal oxide particle according to claim 13, wherein the halide of Li is LiCl.

15. A method for producing the garnet-type composite metal oxide particle according to claim 9, comprising at least a step of reacting by a mechanochemical method.

16. The method for producing the garnet-type composite metal oxide particle according to claim 15, wherein a mixture is treated by reacting in the mechanochemical method, wherein the mixture comprises:
   an Li source powder,
   an La source powder and a Zr source powder;
   a Ga source powder and/or an Al source powder; and
   a halide of Li.

* * * * *